United States Patent
Bandyopadhyay et al.

(10) Patent No.: US 12,556,932 B2
(45) Date of Patent: Feb. 17, 2026

(54) METHOD AND APPARATUS FOR REGISTERING A CITIZEN BAND SERVICE DEVICE

(71) Applicant: Celona, Inc., Campbell, CA (US)

(72) Inventors: Sourav Bandyopadhyay, Liluah Howrah (IN); Vinay Anneboina, San Jose, CA (US); Srinivasan Balasubramanian, San Diego, CA (US)

(73) Assignee: CELONA, INC., Campbell, CA (US)

( * ) Notice: Subject to any disclaimer, the term of this patent is extended or adjusted under 35 U.S.C. 154(b) by 424 days.

(21) Appl. No.: 18/080,918

(22) Filed: Dec. 14, 2022

(65) Prior Publication Data

US 2023/0284033 A1 Sep. 7, 2023

Related U.S. Application Data

(60) Provisional application No. 63/289,281, filed on Dec. 14, 2021.

(51) Int. Cl.
*H04W 16/14* (2009.01)
*H04W 60/00* (2009.01)
*H04W 84/04* (2009.01)

(52) U.S. Cl.
CPC ......... *H04W 16/14* (2013.01); *H04W 60/005* (2013.01); *H04W 84/042* (2013.01)

(58) Field of Classification Search
CPC .. H04W 16/14; H04W 60/005; H04W 84/042
See application file for complete search history.

(56) References Cited

U.S. PATENT DOCUMENTS

| | | | |
|---|---|---|---|
| 2017/0287085 A1* | 10/2017 | Smith | G01S 5/0244 |
| 2020/0059794 A1* | 2/2020 | Singh | H04W 72/04 |
| 2020/0059802 A1* | 2/2020 | Singh | H04W 24/02 |
| 2020/0077457 A1* | 3/2020 | Sevindik | H04W 72/542 |
| 2022/0078689 A1* | 3/2022 | Singh | H04W 28/0226 |
| 2022/0141668 A1* | 5/2022 | Poli | H04W 12/66 |
| | | | 726/6 |
| 2022/0217615 A1* | 7/2022 | Harel | H04W 52/146 |
| 2022/0240259 A1* | 7/2022 | Sevindik | H04L 5/0073 |
| 2022/0256644 A1* | 8/2022 | Hafeez | H04W 28/0864 |

FOREIGN PATENT DOCUMENTS

WO   WO-2020027807 A1 *  2/2020 ......... H04L 12/1407

* cited by examiner

*Primary Examiner* — Mewale A Ambaye
(74) *Attorney, Agent, or Firm* — Jaquez Land Greenhaus & McFarland, LLP; Bruce W. Greenhaus

(57) ABSTRACT

A method that is implemented by a domain proxy is disclosed. The method includes registering a first CBSD (Citizen Band Service Device) with a SAS (Spectrum Access System) to allow the first CBSD to gain access to frequencies in a CBRS (Citizen Band Radio System), the first CBSD being a Category A CBSD. In addition, registering a second CBSD with the same or another SAS to allow the second CBSD to gain access to frequencies in a CBRS, the second CBSD being a Category B CBSD.

6 Claims, 9 Drawing Sheets

METHOD AND APPARATUS FOR REGISTERING A CITIZEN BAND SERVICE DEVICE

CLAIM OF PRIORITY TO PREVIOUSLY FILED PROVISIONAL APPLICATION—INCORPORATION BY REFERENCE

This non-provisional application claims priority to an earlier-filed provisional application No. 63/289,281 filed Dec. 14, 2021, entitled "Method and Apparatus for Domain Proxy in a Communication Network" and the provisional application No. 63/289,281 filed Dec. 14, 2021, and all its contents, are hereby incorporated by reference herein as if set forth in full.

BACKGROUND

(1) Technical Field

The disclosed method and apparatus relate generally to communication networks and more particular, to domain proxy devices that allocate frequency spectrum within a Citizens Band Radio Service (CBRS) network.

(2) Background

FIG. 1 is an illustration of components of a CBRS network used to implement an enterprise network 100. In order to use CBRS frequencies, which represent 150 megahertz of spectrum in the 3.55 GHZ-3.7 GHz band, a network must employ a spectrum access system (SAS) and dynamically manage the use of that spectrum through an Environmental Sensing Capability (ESC) network to avoid interfering with incumbent Navy radar users and other potentially higher priority users.

A SAS 102 is a cloud hosted service operated by an independent entity and does not require that any of the related functionality be implemented by hardware located within the enterprise network 100. The SAS 102 is responsible for monitoring the CBRS frequencies that are available (and unavailable) for use by the enterprise network. When installing a new network, an installer can select a SAS from among several that are available from independent entities that provide their SAS for use by enterprise networks.

In 2019, the FCC's Wireless Telecommunications Bureau (WTB) and the Office of Engineering and Technology certified SASs to begin initial commercial deployments (ICD) for the CBRS at 3.55 GHz. The certified SASs were operated by the following companies: Amdocs, Federated Wireless, Google, Key Bridge and Sony.

Once a SAS 102 is selected, Citizens Broadband Radio Service Devices (CBSDs) installed in the operator's network, such as an in-building access points (AP) 112, outdoor APs 114, etc., are programed to connect securely to the SAS 102 through a domain proxy device 107, 108. In the enterprise network 100, there are two domain proxy devices 107, 108 shown. A domain proxy 107, 108 is an entity that communicates with the SAS 102 on behalf of multiple individual CBSDs 112, 114 or networks of CBSDs. The domain proxy 107, 108 can also provide a translational capability to interface legacy radio equipment in the 3650-3700 MHz band with a SAS 102 to ensure compliance with particular requirements and rules.

A domain proxy operator is an entity managing a system which controls various CBSDs. Those CBSDs do not communicate directly with the SAS. Rather, the SASs are controlled by a system which communicates with the SAS on their behalf. The responsibility of a domain proxy operator is to provide positive control of the CBSDs it manages in order to assure that they are compliant with the emission authorizations issued by the SAS to which the domain proxy communicates.

It should be noted that there are two CBSD categories for which EIRP is defined as follows:

| | Maximum Effective Isotropic Radiated Power (EIRP) (dBm/10 MHz) |
|---|---|
| Category A | 30 |
| Category B | 47 |

The SAS 102 receives information regarding the spectral environment from the ESC Core 104. In at least some instances, a network of sensors 106 provides information regarding the frequencies and power levels of signals that are propagating in the environment of interest to the SAS 102. More particularly, The ESC is a network of sensors used to detect federal frequency use in the 3550-3650 MHz band in protection zones where U.S. Navy radar systems can operate, primarily along the Pacific, Atlantic and Gulf coasts. The ESC informs the SAS of radar operation. The SAS reacts to the information provided by the ESC to ensure that no interference occurs between CBRS and Navy radar operations. There is no direct interaction between the ESC and an operator network. The ESC interfaces only with the SAS.

In addition to information that SAS 102 receives from the ESC Core 104, the SAS 102 also receives information from other SASs 103 operating in the general vicinity, referred to herein as "peer SASs" 103. In a process performed daily known as Coordinated Periodic Activities among SASs (CPAS), all SASs synchronize to ensure protection of incumbent users of the CBRS allocated frequencies. According to requirements established by WinnForum (a non-profit mutual benefit corporation that recites that it is dedicated to advocating for spectrum innovation and advancing radio technologies that support essential or critical communications worldwide), SASs are required to collaborate to determine CBSD power allocation in a substantially similar fashion. In order to achieve synchronous power allocation among all SASs, all SASs perform a CPAS procedure synchronously.

The SAS 102 provides information to a domain proxy that allows spectrum to be allocated among CBSDs of several CBRS networks in a manner that prevents interference between the various CBSDs and CBRS networks. In some cases, each CBRS network 100 has one domain proxy 107, 108. The domain proxy 107, 108 communicates with a Radio Access Network (RAN) within each of several access points (APs) within the CBRS network 100. In the CBRS network 100 shown, at least one in-building AP 112 and one macro AP 114 are present. Note that the RANs that reside within the APs 112, 114 are not shown in FIG. 1.

FIG. 2 illustrates one example of how the CBRS spectrum is made available for use by a hierarchy of users. In accordance with this hierarchy, "Incumbent Access" users have the highest priority, "Priority Access Licensee" (PAL) users have the next highest priority, and "General Authorized Access" (GAA) users have the lowest priority. In the case shown, two "bidders" for CBRS PAL spectrum are shown. The bidders are each allocated several 10 MHz portions of the CBRS spectrum for use as PAL users. The term "bidder" refers to the fact that access to spectrum is auctioned off to entities that bid on the rights to attain a PAL license from the Federal Communications Commission (FCC). While PAL frequencies are licensed for use by a particular PAL user, the PAL frequencies are not allocated for use at all times. Rather, the frequencies that are available are dynamically determined by the SAS 102. That is, the frequencies that are available to any particular user may change from time to time. Because incumbent users have the highest priority, the frequencies that are open to incumbent users will typically always be available. If a PAL user has a license to use a frequency that is current being used or comes into use by an incumbent user, the PAL user will have to yield.

If all 70 MHz PAL slots have been auctioned off, there still remains 80 MHz of bandwidth available for GAA use. If PAL licenses have not been auctioned off, the entire 150 MHz of the CBRS spectrum will be available for GAA use. It is less likely that the entire 150 MHz of GAA will be available in more densely populated areas of the country than in rural areas.

FIG. 3 illustrates the procedure that takes place when a CBSD 112, 114 within a network 100 attempts to gain access to CBRS spectrum. Access is granted to CBSDs on a channel by channel basis. It should be noted that even PAL users must make a grant request to the SAS. The CBSDs 112, 114 within CBRS network 100 rely on the domain proxy 107, 108 to manage the registration and grant of the spectrum from a SAS 102.

When a CBRS network 100 is initially installed, each of the CBSDs 112, 114 starts in an unregistered state 302 (i.e., no spectrum has yet been allocated to the CBSDs 112, 114). Each CBSD 112, 114 moves from the unregistered state 302 to a registered state 304 upon the domain proxy 102 within the CBRS network 100 successfully submitting a registration request on behalf of the CBSD 112, 114. The CBSD 112, 114 then moves to an idle state 306. In Idle state 306, the domain proxy 102 (on behalf of the CBSD 112, 114) can submit "grant requests" to access spectrum to create a channel. If granted, the CBSD 112, 114 moves to a granted state 308. If the grant request fails, the channel is not established and the CBSD 112, 114 remains in the idle state 306. In the granted state 308, users can access the allocated spectrum. To move from the granted state 308 to the authorized state, each CBSD 112, 114 (through the domain proxy 107, 108) must submit a heartbeat request. If the heartbeat request is unsuccessful, then the CBSD 112, 114 returns to the idle state 306 and must submit a new grant request to move from the idle state 306 to the granted state 308. If the heartbeat request is successful, then the CBSD 112, 114 moves to an authorized state 310. Heartbeat requests must be periodically sent. If at any time a periodic heartbeat is not sent within a required time, or the request fails, the CBSD 112, 114 moves back to the idle state 306 and the domain proxy 107, 108 must submit a new grant request on behalf of the CBSD 112, 114.

FIG. 4 illustrates the messaging between the domain proxy 107, 108, a Self-Organizing Network (SON) device 403 and the SAS 102 during registration of an CBSD 112, 114. The devices are shown at the top of the figure and communications occur over time, with communications that occur earlier being shown closer to the top of the figure.

CBSD information 401 is provided to the SAS 102 through the domain proxy 107, 108 in a registration request message 402. A professional installer is required for installation and configuration of Category B CBSDs and some Category A CBSDs. A professional installer would be authorized by the training program to receive a CBRS Public Key Infrastructure (PKI) signed digital certificate after passing an accredited professional training program. The certificates are individualized to each professional installer to ensure both authentication and non-repudiation. Professional installers use their signed digital certificates to interact with either SAS 102 and/or the domain proxy 107, 108 to attest to various CBSD information (provide CPI signed CBSD information 401), including CBSD installation and configuration parameters.

For example, a network operator may rely on a CPI that will use his credential to provide CBSD metadata to a SAS 102 in the registration request message 402. The information, for example, may include the fact that the directional high-gain antenna is pointing at an azimuth of 90 degrees (east). Since installer credential is within the trust boundary of the PKI, the CPI is held responsible and accountable for the accuracy of that information provided during registration. Upon receiving the registration request 402 from the CPI, the SAS 102 authenticates the CBSD operating parameters via the digital signature from the CPI. The SAS 102 provides a Registration Response message 404 to the domain proxy 107, 108 indicating a successful registration of the CBSD 112, 114. The Registration Response message 404 includes a valid CBSD ID 406. If the Registration Request fails, then the attempt to register the CBSD 112, 114 is repeated 408.

Once the CBSD 112, 114 is registered and a CBSD ID has been issued, the CBSD ID can be used to generate and send a Spectrum Inquiry Request message 410 to the SAS 102. In response to the Spectrum Inquiry Request 410, the SAS 102 returns a Spectrum Inquiry Response message 412. The Spectrum Inquiry Response message 412 provides the maximum EIRP available, in dBm/MHz on each available 10-MHz channel. In addition, the SAS 102 provides a parameter that indicates the quality of each channel.

The channel quality information provided by the SAS 102 is provided as a bitmap indicating what information is provided for each CBRS channel from 1 to 15. For example, a bit within the message transmitted by the SAS 102 may be set to '1' to indicate that channel information is included. Alternatively, setting that bit to '0' indicates that no channel information is included. In some embodiments, the channel quality information provided for each of 10 Mhz channel 1 through 15 includes: (1) information indicating the UL (Uplink) channel quality, (2) information indicating the DL (downlink) channel quality; (3) information regarding the individual time slot level for both the UL and the DL; (4) a preferred time division duplex (TDD) configuration that is based on the characteristics of the CBSDs that are using the channel; (6) information regarding the predicted/potential interference impact of C-band; (7) information regarding the predicted/potential interference impact within the 3.45 GHz to 3.55 GHz band; and (8) additional relevant metrics intended to help with the channel assignment for the individual CBSDs.

The maximum EIRP available is based on the EIRP capability of the CBSD established during registration. This information 414 is used to generate channel information for a SON device 403. A SON 403 automatically plans, configures, manages, optimizes, and heals itself. Typically, the SON 403 is functionality that is executed by processor resources co-located with the processor resources that execute the domain proxy 108 functionality. SONs 403 can offer automated functions such as self-configuration, selfoptimization, self-healing, and self-protection. A graphical illustration 416 of the frequency allocation color scheme is shown. That is, CBSDs that are close enough to each other to cause interference with one another are allocated different frequencies. These frequencies can be represented by a particular color. In the figure, some of the CBSDs are allocated frequencies that are in a blue allocation group (and thus shown as blue spheres 417) and other CBSDs are allocated frequencies that are in the yellow frequency allocation group (and thus shown as yellow spheres 415). A communication 418 is sent from the SON 403 to the domain proxy 107, 108 that indicates which channels have been allocated to each of the CBSDs.

FIG. 5 shows additional messaging that takes place between the SON 403, domain proxy 107, 108, SAS 102 and an Auto Configuration Server (ACS) 502. An ACS is Security Assertion Markup Language (SAML) terminology for the location at a service provider that accepts messages (or SAML artifacts) for the purpose of establishing a session based on an assertion. SAML is a standardized way to tell external applications and services that a user is who they say they are. SAML makes single sign-on (SSO) technology possible by providing a way to authenticate a user once and then communicate that authentication to multiple applications.

After the SON 403 indicates which channels have been allocated, the domain proxy 107, 108 creates grant requests 504 for each of the allocated channels. The grant requests are communicated to the from the domain proxy 107, 108 to the SAS 102. In response, assuming the channels remain available, the SAS 102 sends out a grant response 506 for each of the grant requests 504. A graphical illustration 508 shows a change in the status of the CBSDs 112, 114 in the network. This change is communicated from the SON 403 to the domain proxy 107, 108. In response, the domain proxy 107, 108 sends new grant requests 510 to the SAS 102 to gain access to the channels that the SON has now assigned to the CBSDs 112, 114. In present systems, there is one domain proxy that is designated to interface with CAT A CBSDs and a different domain proxy that is designated to interface with CAT B CBSDs at the same site within an enterprise network. Therefore, if there are several sites, each would have a at least one domain proxy and if there are combinations of CAT A and CAT B CBSDs at some sites, then more than one domain proxy at such sites. Furthermore, in many cases it is necessary to have one domain proxy dedicated to interfacing with indoor CBSDs and a different domain proxy to interface with outdoor CBSDs, even if all such CBSDs are of the CAT B type.

While the current state of the art operates relatively well in many cases, there are some problems that exist with the operation of these systems. For example, additional domain proxy devices have to be added to support different types of CBSDs. In particular, current deployments require that all of the CBSDs be either CAT A or CAT B, but that the same domain proxy not be used for both CAT A and CAT B CBSDs. This is because the structure of each is different, the type of registration is different, the SON algorithms are different, etc. This follows from the fact that the footprint of a CAT A CBSD and a CAT B CBSD is very different. A CAT A CBSD has a relatively small footprint and has very little potential for interference with outside entities. In contrast, CAT B CBSDs have greater potential for interference with other entities due to the larger footprint, which might span multiple buildings, and have a greater EIRP at which they transmit. Furthermore, the information received from the SAS does not provide a clear understanding of the channel quality. Also, there is currently no mechanism for adapting the channel allocation and TDD configuration without requiring a reallocation of all CBSDs. Therefore, there are currently significant outages in the service that an enterprise network operating on a CBRS network can provide when CBSDs are upgraded. Furthermore, in some cases constraints and operational limitations may be presented due to the fact that CAT A and CAT B CBSDs within the same network cannot be serviced by the same domain proxy device.

Lastly, when a CBSD is installed in an enterprise network, bringing the CBSD online requires that the frequencies allocated to each of the CBSDs in the enterprise network need to be withdrawn and reallocated. This results in a substantial interruption to the service on the enterprise network.

Accordingly, it would be advantageous to provide a system that integrates the functionality performed for both CAT A and CAT B CBSDs.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 1:
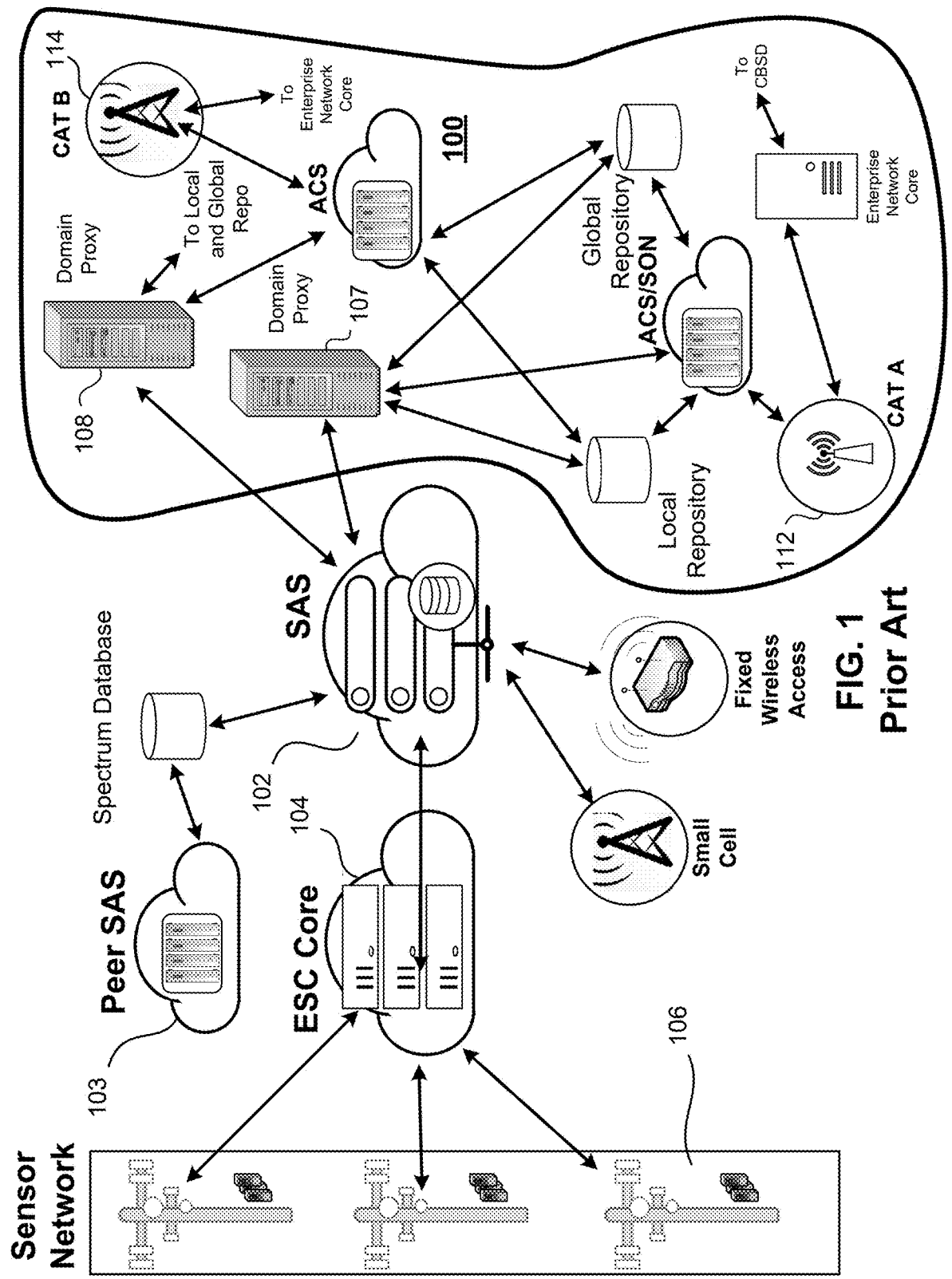
FIG. 1 is an illustration of components of a CBRS network used to implement an enterprise network.
Figure 2:
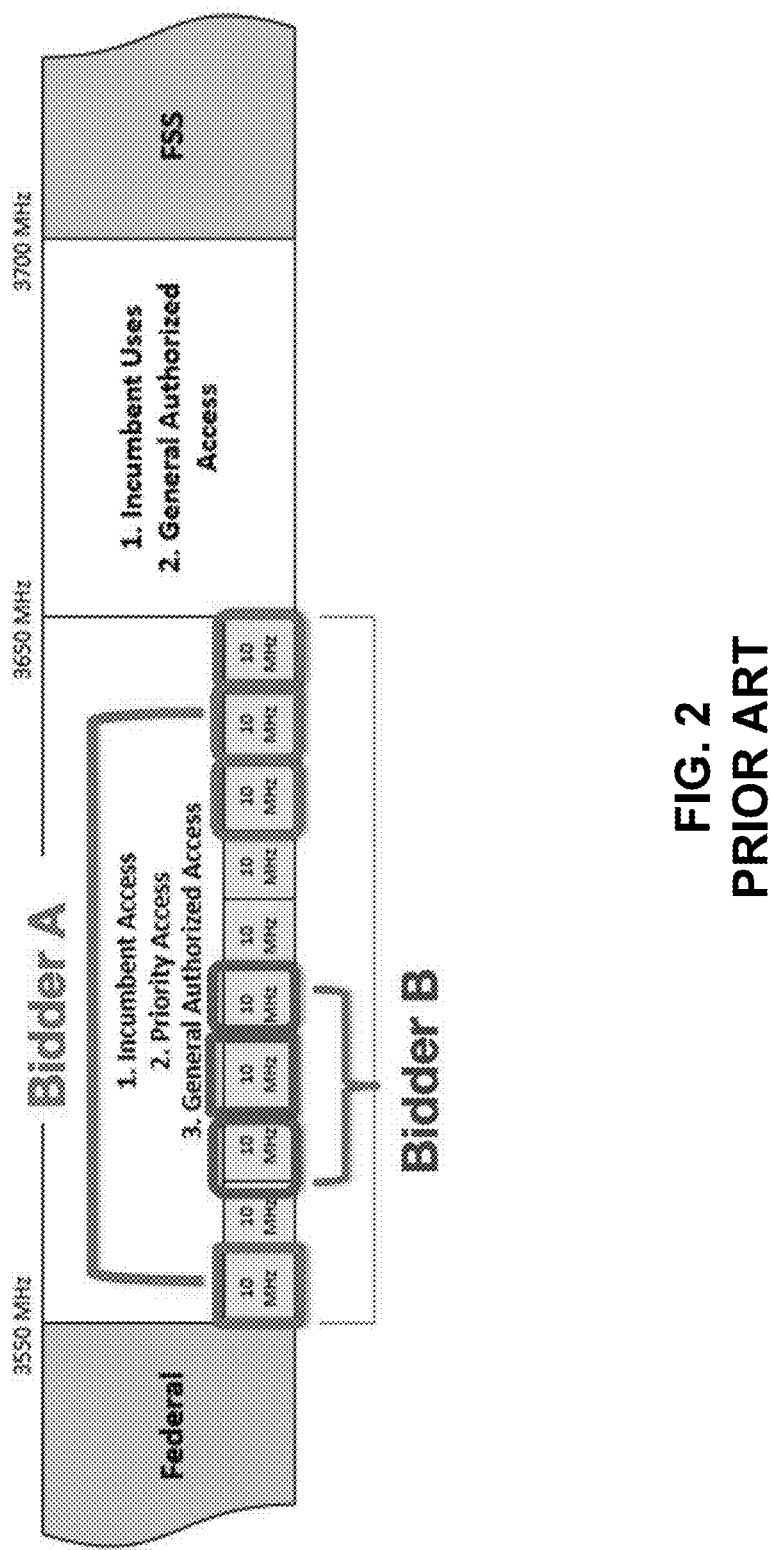
FIG. 2 illustrates one example of how the CBRS spectrum is made available for use by a hierarchy of users.
Figure 3:
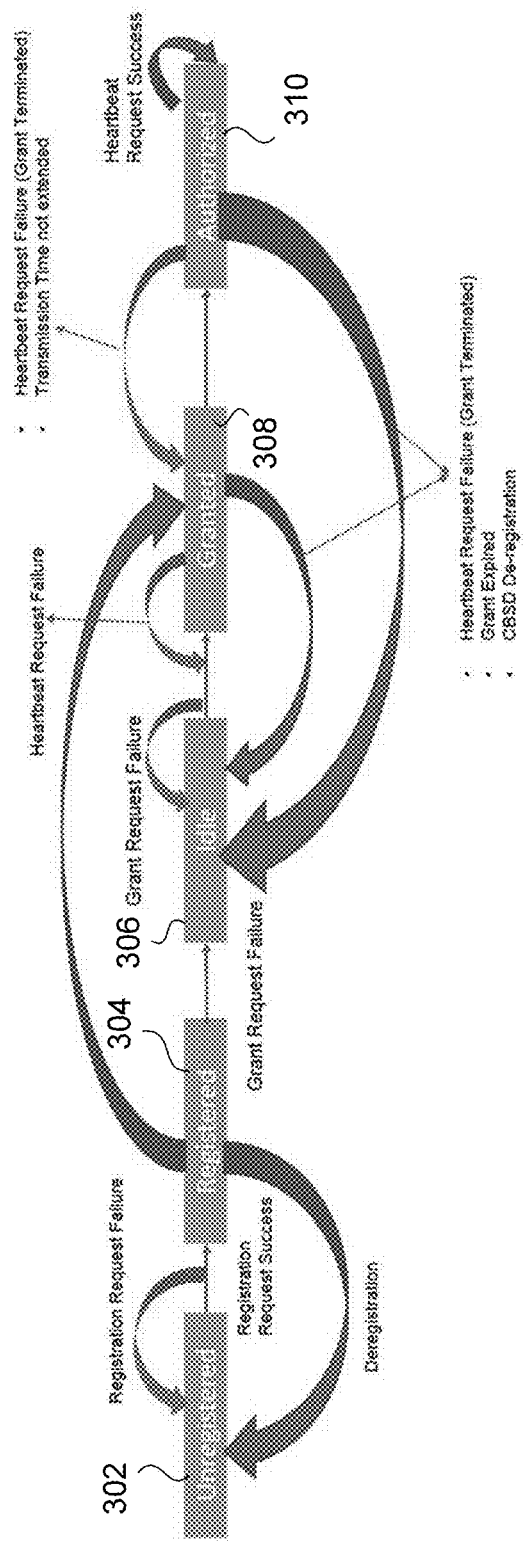
FIG. 3 illustrates the procedure that takes place when a CBSD when a network attempts to gain access to CBRS spectrum.
Figure 4:
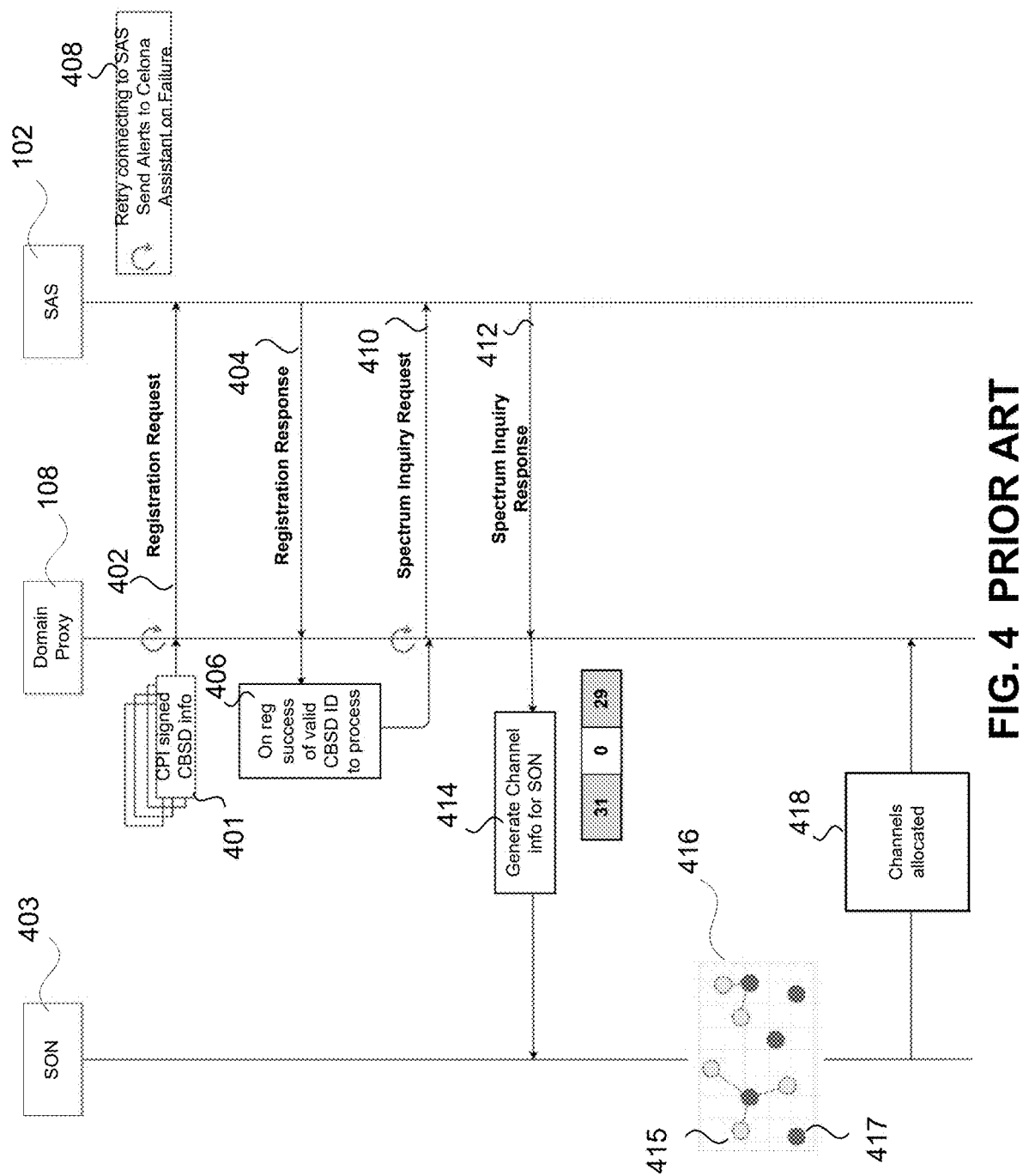
FIG. 4 illustrates the messaging between the domain proxy a Self-Organizing Network (SON) device and the SAS during registration of an CBSD.
Figure 5:
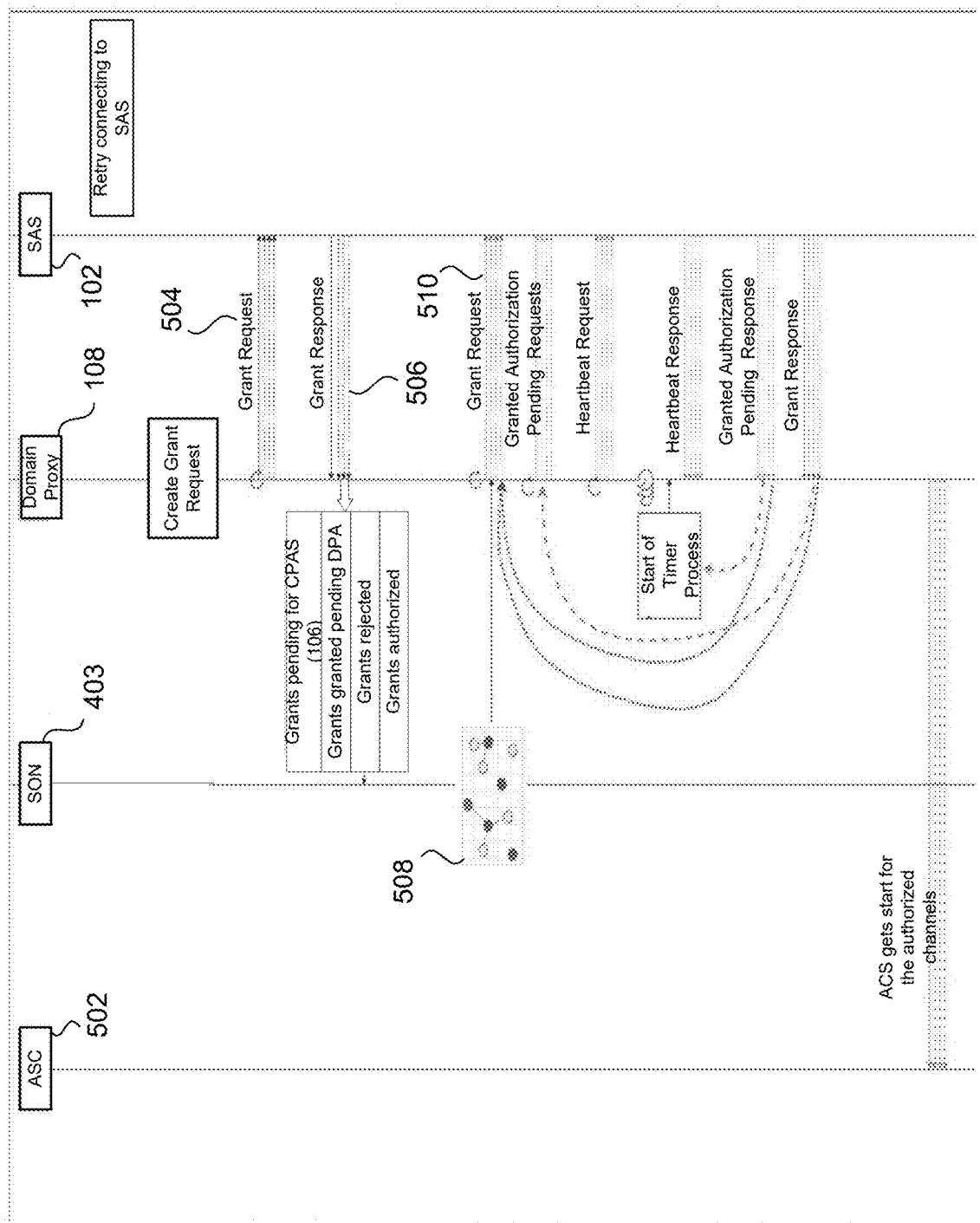
FIG. 5 shows additional messaging that takes place between the SON, domain proxy SAS and an Auto Configuration Server (ACS).
Figure 6:
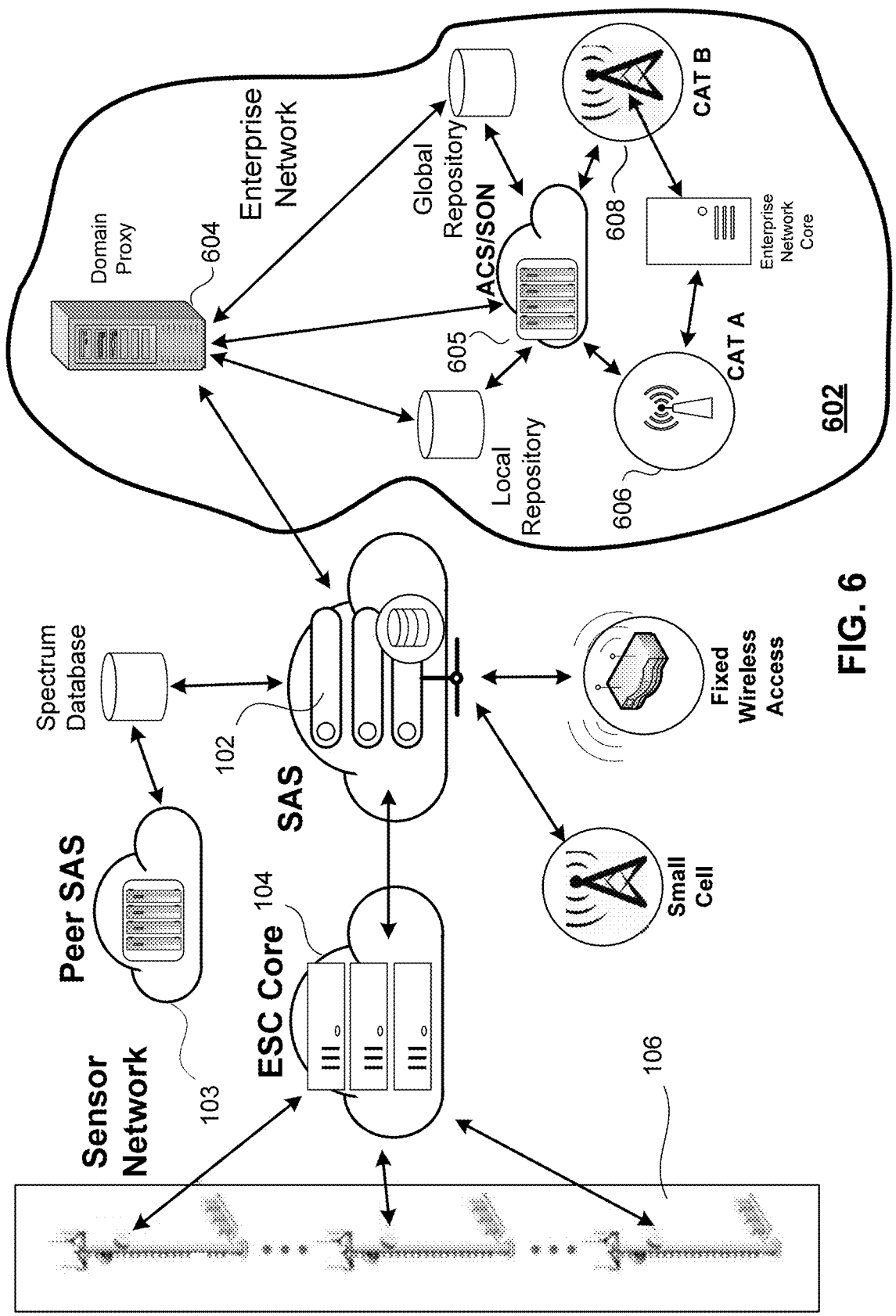
FIG. 6 shows an enterprise network 602 including Citizen Band radio System Devices (CBSDs).

FIG. 6 shows an enterprise network 602 including Citizen Band radio System Devices (CBSDs), such as: (1) CAT A CBSDs 112; (2) CAT B CBSDs 114; (3) 4$^{th}$ Generation LTE eNodeBs (eNBs); (4) 5th Generation New Radio (NR) eNodeBs (gNBs); and (5) other types of access nodes capable of transmitting signals to and receiving signals from User Equipment (UEs) using CBRS band transmissions. For the sake of simplicity, the example enterprise network 602 is shown with only one CAT A CBSD 606 and one CAT B CBSD 608. However, typical enterprise networks may have several CAT A and CAT B CBSDs located both indoors and outdoors and in some embodiments, the CBSDs are located within several different sites within the same enterprise network. In some embodiments, different sites within the same enterprise network may be relatively near to one another. For example, in some enterprise networks, each site comprises one building located, each such building located within an urban setting in which the buildings are separated by one or more blocks. In some enterprise networks sets of buildings and surrounding grounds may constitute a site, with different sites located in different cities, such as might be the case with a university having campuses located in different cities. In such a case, each university campus may constitute an enterprise network site, each site being part of the same enterprise network. It should be noted that details related to the number of enterprise sites and which CBSDs are on each are not provided in the illustration of the enterprise network 602.

In some embodiments of the disclosed method and apparatus, one domain proxy 604 is provided to service the enterprise network 602. However, in other embodiments, there may be more than one domain proxy 604. The domain proxy 604 receives information from a SAS 102 that indicates to the domain proxy what Citizen Band Radio System (CBRS) channels are available and the power levels that can be used when a CBSD transmits on each such channel. The domain proxy 604, together with the Auto Configuration Server (ACS)/Self Organizing Network (SON) 605 uses this information to determine how to allocate frequencies for use by each of the CBSDs that will be servicing User Equipment (UEs) that accesses the enterprise network resources.

In some embodiments, a unified SON collocated with either the domain proxy 604, an ACS or both, all coordinate to determine both frequency allocations to both CAT A and CAT B CBSDs based on the information from the domain proxy 604. Alternatively, the SON functionality and/or the ACS functionality may be performed by a processor that is dedicated to the SON functionality and located on premise within the enterprise network. In yet another embodiment, the SON functionality and/or the ACS functionality may be located in the cloud. That is, process resources that are available in the cloud can be tapped to provide the domain proxy, SON and/or ACS functionality, either using the same process resource or different resources for each or any combination thereof. For the sake of simplicity, the enterprise network 602 shows an integrated ACS/SON 605 located on premise (in the enterprise network 602).

In some embodiments, one integrated domain proxy 604 supports various types of CBSDs. Accordingly, an efficient frequency allocation can be made by taking into account all of the CBSDs, including both CAT A and CAT B CBSDs, whether located indoors or outdoors. In some embodiments in which multiple CBSDs are present in the enterprise network, the SAS can accept a "group" and allow a local arbitrator to provide coordination functions. That is, particular frequency allocations between the members of such a group are not relevant to the SAS, but rather the group is treated for purposed of allocations and determinations regarding interference, as a single node.

Figure 7:
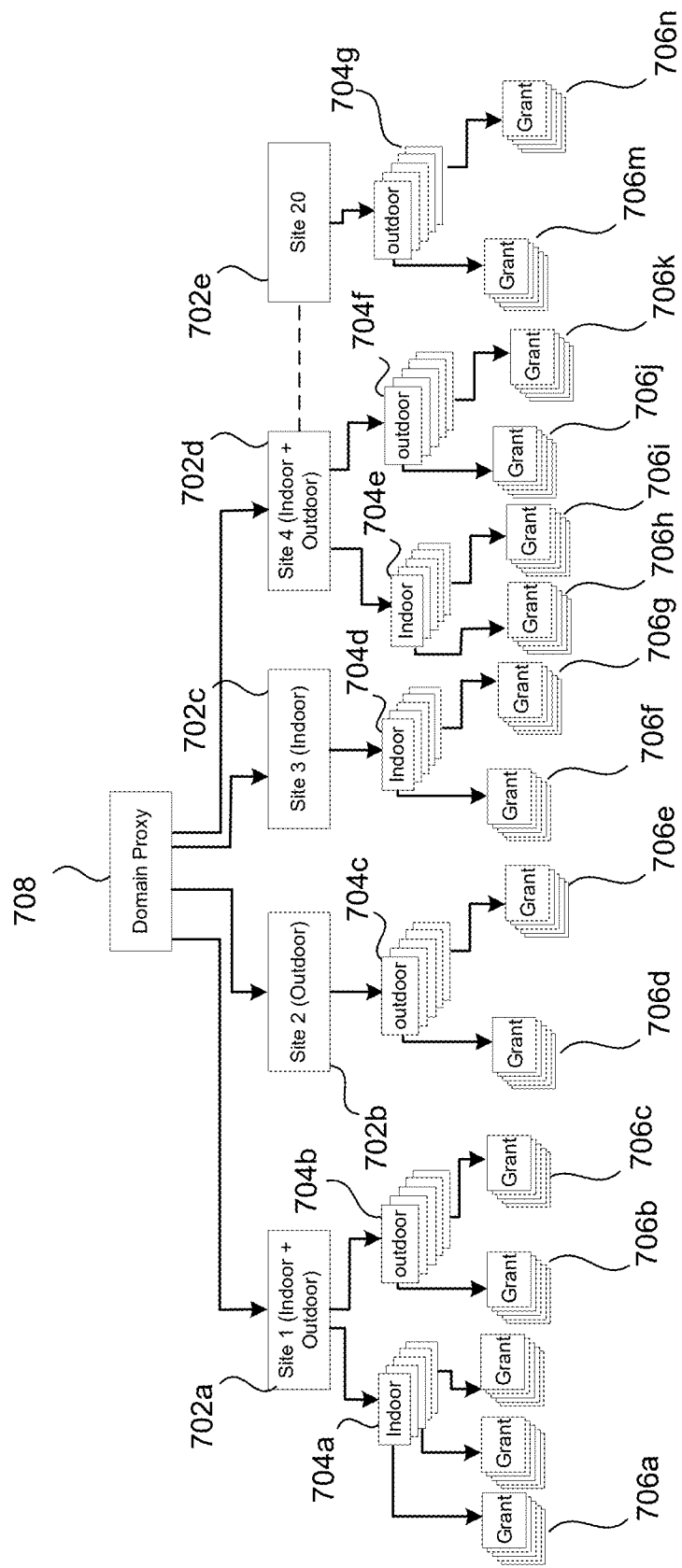
FIG. 7 is an illustration of one possible configuration for the enterprise network in which there are 20 different sites.

FIG. 7 is an illustration of one possible configuration for the enterprise network in which there are 20 different sites 702 (five of which are explicitly shown). It should be noted that throughout the present disclosure, elements having a reference designation having the same numeric content, followed by a unique alphabetic character, are essentially the same and may be referenced collectively by referencing the numeric portion alone. For example, each of the reference designations 702a, 702b, etc. refer to a unique site within the enterprise network and the group of all such sites can be referenced collectively, simple as site 702.

Each site represents a particular geographic location within the enterprise site or set of enterprise sites, such as a building, campus of buildings, a suite of offices within a building, etc. The sites of an enterprise do not have to be contiguous and can be located in different cities or even in different countries.

The first site comprises both indoor and outdoor CBSDs 704. Accordingly, these CBSDs may be either all CAT B type CBSDs or a mix of CAT A and CAT B type CBSDs. The fact that the domain proxy 708 can support both CAT A and CAT B type CBSDs allows the enterprise network to scale more efficiently and more easily. That is, a single domain proxy and associated ACS/SON can be used to provide frequency allocation to all of the CBSDs of the entire enterprise network (i.e., across all of the enterprise network sites). Such efficiencies are particularly great in the case of a network that has only CAT A CBSDs and that later is expanded to include CAT B CBSDs and vice versa.

At least some of the indoor CBSDs 704a that reside at the first site 702a are associated with grants 706a to access network resources. In one embodiment, each CBSD 704a may request multiple grants, from 1 to 15, one for each of the 10 MHz channels in the CBRS band. Based on the response received from the SAS, one or more of the grants are activated for actual use by the CBSD.

As shown, there are two particular indoor CBSDs 704a within the first site 702a that are associated with several grants 706a. In addition, one of the indoor CBSDs 704a in the first site 702a is associated with only one grant that is currently active. The other CBSDs in the first site 702a do not currently have any active or pending grants shown. The set of outdoor CBSDs 704b in the first site 702a are all associated with several grants 706b, 706c. The dotted lines between the grants 706b and the grants 706c indicate that all of the other outdoor CBSDs 704b at the first site 702a are also associated with several grants 706. The domain proxy 708 provides support for all of the sites 702 and all of the CBSDs 704 at each of the sites 702. In some embodiments, the domain proxy 708 is located on premises (i.e., functionality that is executed in a processor running on hardware located within one of the enterprise network sites). However, in other embodiments, the domain proxy 708 is located in a cloud and accessible through a communication link to the cloud resource that is hosting (i.e., executing the functionality of) the domain proxy 708.

In some embodiments, a connection through a cellular link to internet resources provides a redundant means for a domain proxy 708 residing locally on the enterprise site to access the internet and thus make contact with a SAS 102 and in some embodiments with other sources of information regarding the interference environment. Maintaining the connection to a SAS 102 is critical, since a domain proxy 708 can only provide information to the ACS (Auto Configuration Server)/SON 605 for a limited period of time after losing a connection from the SAS 102. That is, industry standards require that a domain proxy 708 shut down all of its CBSDs if the domain proxy 708 cannot contact the SAS 102 for an extended period.

Furthermore, in some embodiments, in addition to information received from the SAS 102 regarding what spectrum allocation would be appropriate, the domain proxy 708 also receives additional information from user equipment (UEs) regarding what is going on in the location of that UE and events and signals that might add to interference on frequencies that might be open to be allocated to a CBSD 704. Still further, in some embodiments, the domain proxy receives information regarding potential interference from CBSDs 704 within the enterprise network. In some embodiments, the domain proxy 708 receives information from both CBSDs 704 and UEs. In particular, the environment that exists within a building serviced by an enterprise network will not be known to the SAS 92. However, in some embodiments, these sources of information are woven together with the information provided by the SAS 102 to provide information that the domain proxy can then provide to the ACS/SON 605, which is responsible for coordinating the allocation of spectrum to particular CBSDs 704 within the enterprise network. In some embodiments, the frequency allocation is managed by a SON, which interfaces with an ACS that then communicates with a BS/AP, such as a CAT A or CAT B CBSD 704 to determine the frequency allocation for that BS/AP. In some such embodiments, the SON provides coordination between several BS/APs to assist in preventing interference between the various BS/APs.

In some embodiments, additional information regarding potential interference can be attained from other domain proxies. In some embodiments, this information includes configuration information regarding CBSDs to which the other domain proxies are in direct contact and with which the other domain proxies are responsible for participating in the frequency allocations. Such other domain proxies may be part of the same network or associated with another network.

In some embodiments, the information is used in real time. However, in other embodiments, this information is also used to anticipate the availability of spectrum and the likelihood of interference. Thus, the information provided by the domain proxy 708 is used to determine which CBSDs 704 should operate at which frequencies. The added complexity of having the domain proxy 708 be responsible for interacting with both CAT A and CAT B CBSDs increases both the amount of information that is available to the domain proxy 708, but also the complexity of the algorithms used to determine the frequency allocations.

In some embodiments, a user interface (UI) that allows personnel responsible for installing and maintaining the enterprise network 602 to access installation and maintenance information, provides the following information to those that have access to the UI:

SUSPENDEDSTATE—This alert is triggered when a channel granted to an AP is suspended by SAS because AP is deployed in a location with incumbent activity. All grants that cause interference to Navy operations are suspended TERMINATEDSTATE—This alert is triggered when a channel granted to an AP is terminated. This happens when a channel allocated to Priority Access License (PAL) holder is activated or an incumbent is nearby. This may also happen when the SAS balances the channels that have been allocated to General Authorized Access (GAA) users operating in the region. Celona Domain Proxy service will attempt to reallocate a new channel to the AP from the available channels NOSPECTRUM—This alert is triggered when an AP has no spectrum available at that location. This is not commonly seen except for locations in Hawaii.

CPIERROR—This alert is triggered when the CPI parameters or the CPI certificate/installer credentials entered are incorrect CBSDBLACKLIST—This alert is triggered when a specific AP has been blacklisted by SAS. This is a precautionary alert and hasn't been observed yet.

FORCEDREREGISTER—When a registered AP needs to be reset to get new grants or needs to move from one location to another, this alert will be triggered as the AP will be deregistered and re-registered.

SASCONNECTIONSTATE—This alert is triggered when there is a connectivity issue with SAS SASTLSAUTHSTATE—This alert is triggered when there is an authentication failure with SAS CONFIGALERTS—Alert send for the missing configs (certificates, SAS credentials)

Figure 8:
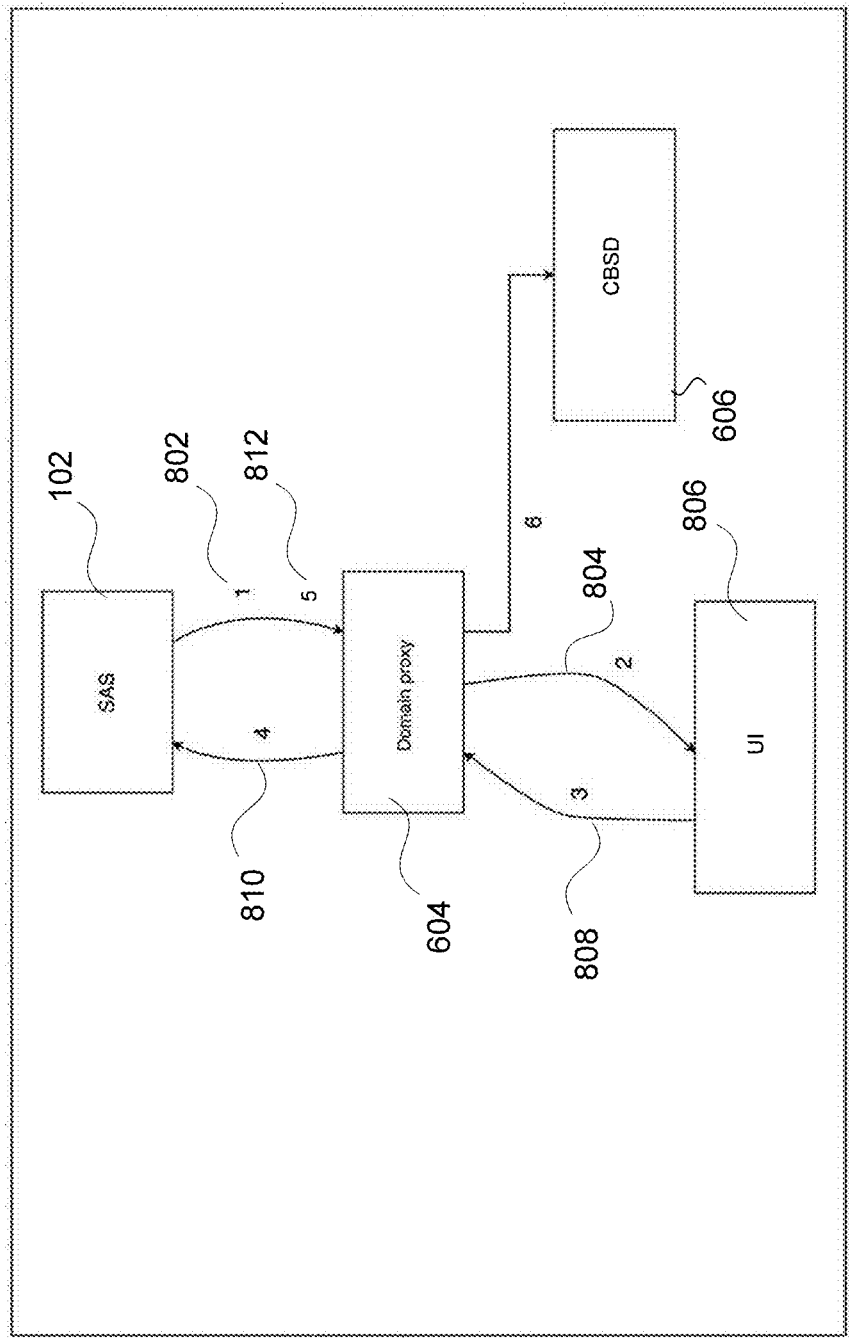
FIG. 8 is an illustration of the process that is implemented to use information provided by the SAS to the domain proxy to inform maintenance personnel of issues with the quality of a CBSD channel and to update channels allocated to the CBSDs if authorized to do so.

FIG. 8 is an illustration of the process that is implemented to use information provided by the SAS 102 to the domain proxy to inform maintenance personnel of issues with the quality of a CBSD channel and to update channels allocated to the CBSDs 606, 608 if authorized to do so.

Initially, the SAS 102 provides information 802 to the Domain Proxy 604 regarding the quality of channels available to be allocated to the CBSDs 606, 608 in the enterprise network. That includes both channels that might already be allocated to CBSDs 606, 608. If the quality of any of the channels that are currently allocated to a CBSD 606, 608 is below a specified threshold, then the domain proxy 604 provides an alert 804 to the enterprise network UI 806 regarding the poor channel quality. In some embodiments, maintenance personnel can then decide to update the channel allocation to replace the previously allocated channel that has poor quality, by allocating a new channel to replace the previously allocated channel. Accordingly, authorization 808 is sent from the UI 806 to the domain proxy 604. The domain proxy 604 sends a request 810 to the SAS 102 requesting information regarding additional channels that are available to be used to replace the currently allocated poor quality channel. In response, the SAS 102 provides information 812 regarding new channels that are available to replace the poor channel. In one embodiment, the ACS/SON has the domain proxy 604 send requests to the SAS on behalf of the other CBSDs. These requests, request the channel quality information of the individual channels. This is done to orthogonalize the channel allocations to the CBSDs. The ACS/SON then allocates the channels to the CBSDs in the site based on the channel quality information received for the CBSDs. Lastly, the domain proxy 604 provides the information regarding a new channel allocation to the CBSD 606 (in some embodiments, through the ACS/SON 605).

In some embodiments, the quality information is communicated in a message having a series of bits dedicated to indicating whether the message includes quality information. Each of the bits in the series indicates whether quality information is present in the message for a corresponding channel. Accordingly, in an embodiment in which there are 15 possible channels, 15 bits within the message would be dedicated to indicating for which of the 15 channels there is quality information in that message. In some embodiments, the quality information includes information related to the uplink, downlink, slot level, TDD (time division duplex)

configuration preference, impact of C-band and impact of other neighboring frequency bands (e.g., 3.45 GHz to 3.55 GHZ).

In some embodiments, in order to more easily replace one CBSD with another, a "proxy" serial number is generated by the domain proxy. The proxy serial number is associated with a specific CBSD registration with the SAS. The proxy serial number is a proxy for the actual serial number of the CBSD (or sector of the CBSD) and is generated as a function of: (1) the Site ID of the site at which the CBSD is installed, (2) the CBSD Type, and (3) a uniquely generated number generated for the purpose of the associating information that the SAS has related to the CBSD (or sector thereof) with whichever CBSD the domain proxy wishes to have perform the functions that the SAS assumes that CBSD is performing. Accordingly, the proxy serial is an abstraction (i.e., proxy) for the actual serial number of the CBSD that is installed in the enterprise network and allows the actual hardware to be swapped without the need to alter the configuration maintained in the SAS.

When the hardware within a given CBSD (or sector of a CBSD) is replaced, the domain proxy will select the serial number of the replacement hardware that is locally available and map this new serial number to the established proxy serial number associated with the hardware to be replaced. The SAS provided configurations will then be applied to the new CBSD hardware without any direct communication with the SAS. Therefore, the use of the proxy serial number is used for registering with the SAS and can be seamlessly transferred between different CBSDs.

Figure 9:
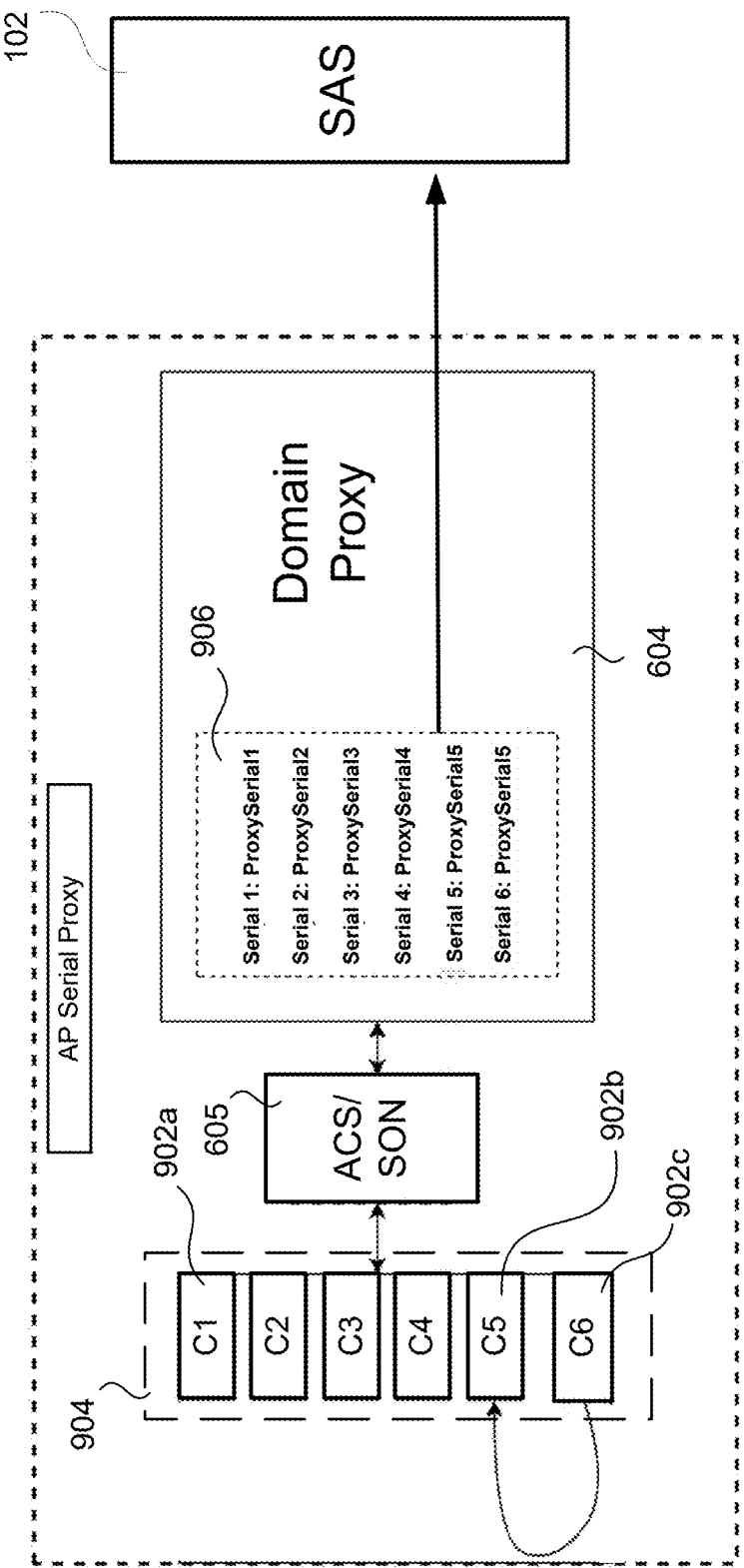
FIG. 9 is a graphical representation of the manner in which the proxy serial number is used.

FIG. 9 is a graphical representation of the manner in which the proxy serial number is used. The ACS/SON 605 is coupled to a group of CBSDs 902 that reside with the same Interference Coordination Group (ICG) 904. Initially, the first five CBSDs 902a through 902b (i.e., C1-C5) were registered with the SAS 102 by the domain proxy 604. The domain proxy maintains a CBSD serial number to proxy serial number cross-reference table 906 that relates the actual serial number of each CBSD 902 that is registered with the domain proxy 604 with a proxy serial number that the domain proxy 604 has assigned to the CBSD 902. The figure illustrates that the CBSD 902b was taken off-line, possibly for maintenance or for any other reason, as indicated by the fact that the CBSD 902b is tinted red. Initially, the CBSD 902b having a serial number of "serial 5" was associated with the proxy serial number ProxySerial5. However, upon being taken off-line, the CBSD 902c, which has a serial number of "serial 6" was assigned in the proxy serial number cross-reference table 902b to take on the proxy serial number of "ProxySerial5" in place of the CBSD 902b. Therefore, all of the information that the SAS has associated with the CBSD 902b is transferred to CBSD 902c. In this way, the service associated with the other CBSDs 902 within the ICG 904 is not disrupted.

The following should be further noted.

In some embodiments, the domain proxy treats indoor and outdoor deployments independently for SAS interactions and spectrum allocations. Furthermore, in some embodiments, the domain proxy treats indoor and outdoor deployments together for SAS interactions and spectrum allocations. Still further, in some embodiments, the domain proxy scales across multiple sites and CAT-A and CAT-B cells coexist in a deployment.

In still other embodiments, the SON manages the spectrum allocation to the individual CBSDs. In some embodiments, the SON balancing the spectrum allocations for a given site accounting for CAT A, and CAT B CBSDs and the SON balances the spectrum allocations for a given site accounting for indoor, and outdoor CBSDs. In some embodiments, user interface specific indications of operation state for a given deployment provide indications of the spectrum allocation to the individual CBSDs.

In some embodiments, the domain proxy is supported in an enterprise edge compute platform and manages the connectivity to the SAS integrated with the connectivity to the enterprise campus.

In some embodiments, the domain proxy is supported in a cloud compute platform and manages the connectivity to the SAS independent of the connectivity to the enterprise campus.

In some embodiments, the domain proxy receives quality information and a TDD configuration from the SAS for CBSDs and provides the channel allocation to the individual CBSDs based on received channel quality information. The domain proxy also provides an indication of the TDD configuration to the individual CBSDs based on the aggregate set of channels allocated to the CBSD.

In some embodiments, the observed channel quality information and the supportable TDD configuration is reported from the SAS. Furthermore, an indication as to whether the channel quality information is included for each channel is provided and the suggested channel quality information for channels includes information on UL channel quality, DL channel quality, individual time slot level information for both UL and DL, preferred TDD configuration based on the constitution the CBSDs using the channel, predicted/potential interference impact of neighboring bands, and other relevant metrics that help with the channel assignment for the individual CBSDs.

In some embodiments the observed channel quality information and the supportable TDD configuration for each channel are based on measurements done at the site. In some embodiments, a proxy serial number is used in place of the real serial number of the CBSD. In some embodiments, the registration with the SAS is performed with the proxy serial number instead of the actual serial number of the CBSD. In some embodiments, a first CBSD is replaced with a second CBSD in the same site, the second CBSD having a different serial number. In some embodiments, the proxy serial number is used for original CBSDs is retained for the newly introduced CBSD and the registration with the SAS retained without disruption of service.

In some embodiments, proxy serial numbers are registered ahead of deployment of an actual CBSDs on site and the grants for these CBSDs not requested by retained in a suspended state. In some embodiments, the registered proxy serial number is used for subsequent introduction of new CBSDs on site without disrupting the other CBSDs deployed on site. In some embodiments, the domain proxy requests more grants from the SAS than what is required for the individual CBSD. In some embodiments, the domain proxy retains the grants allowed by SAS for the CBSD. In some embodiments, the domain proxy activates a subset of the granted channel for the CBSD.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method implemented by a domain proxy comprising:
   a) registering a first Citizen Band Service Device (CBSD) through the domain proxy with a Spectrum Access System (SAS) to allow the first CBSD to gain access to frequencies in a Citizen Band Radio System (CBRS), the first CBSD being a Category A CBSD; and
   b) registering a second Citizen Band Service Device (CBSD) through the same domain proxy as the first CBSD with the same or another Spectrum Access System to allow the second CBSD to gain access to frequencies in a Citizen Band Radio System (CBRS), the second CBSD being a Category B CBSD; and
   c) generating, by the proxy domain, a proxy serial number for a given CBSD, therein swapping a hardware configuration maintained by the SAS, used by the given CBSD, without requiring altering a configuration maintained by the SAS.

2. The method of claim 1, wherein the domain proxy is supported in an enterprise edge compute platform and manages connectivity to the SAS integrated with connectivity to an enterprise campus.

3. The method of claim 1, wherein the domain proxy is supported in a cloud compute platform and manages connectivity to the SAS independent of the connectivity to an enterprise campus.

4. The method of claim 1, wherein the domain proxy is provided with a cellular link to an internet resource as a redundant means to make contact with the SAS.

5. The method of claim 1 further comprising:
   the proxy serial number being associated with the given CBSD registration with the SAS, the proxy serial number being a proxy for a serial number of the given CBSD; and
   the proxy serial number being generated as a function of:
   (1) a Site ID of a site at which the given CBSD is installed,
   (2) a CBSD Type, and
   (3) functions that the SAS associates with the given CBSD.

6. The method of claim 1, wherein
   channel allocation and TDD configuration, including assigning proxy serial numbers, without requiring a reallocation of all CBSDs registered with the SAS; therein, avoiding outages in service that an enterprise network operating on a CBRS network can provide when CBSDs are upgraded; and
   when a new CBSD is installed in the enterprise network, bringing the new CBSD online, including assigning a proxy serial number to the new CBSD, and therein does not require withdrawing and reallocating frequencies allocated to each of the CBSDs in the enterprise network.

* * * * *